United States Patent
Schmacke et al.

(10) Patent No.: US 12,262,653 B2
(45) Date of Patent: Apr. 1, 2025

(54) STABILIZER

(71) Applicant: Walterscheid GmbH, Lohmar (DE)

(72) Inventors: Jan-Philipp Schmacke, Lohmar (DE); Manuel Thiel, Windeck-Herchen (DE)

(73) Assignee: Walterscheid GmbH, Lohmar (DE)

( * ) Notice: Subject to any disclaimer, the term of this patent is extended or adjusted under 35 U.S.C. 154(b) by 657 days.

(21) Appl. No.: 17/548,639

(22) Filed: Dec. 13, 2021

(65) Prior Publication Data

US 2022/0185047 A1  Jun. 16, 2022

(30) Foreign Application Priority Data

Dec. 15, 2020  (EP) .................................... 20214377

(51) Int. Cl.
| | | |
|---|---|---|
| *A01B 59/041* | (2006.01) | |
| *A01B 59/00* | (2006.01) | |
| *B60D 1/32* | (2006.01) | |
| *B60D 1/34* | (2006.01) | |
| *B60D 1/30* | (2006.01) | |

(52) U.S. Cl.
CPC .............. *A01B 59/004* (2013.01); *B60D 1/30* (2013.01)

(58) Field of Classification Search
CPC .............. A01D 59/0004; A01D 59/041; A01D 59/0415; A01D 59/004; B60D 1/30
See application file for complete search history.

(56) References Cited

U.S. PATENT DOCUMENTS

| | | | | |
|---|---|---|---|---|
| 4,191,280 A | | 3/1980 | Copperwheat | |
| 5,462,303 A | * | 10/1995 | Langen ................ | A01B 59/041 172/450 |

(Continued)

FOREIGN PATENT DOCUMENTS

| | | |
|---|---|---|
| DE | 2737169 A1 | 5/1978 |
| DE | 3505243 A1 | 8/1986 |

(Continued)

OTHER PUBLICATIONS

EPO Extended European Search Report mailed Jun. 2, 2021 for Application No. EP20214377 (15 pages; with English machine translation).

*Primary Examiner* — Adam J Behrens
*Assistant Examiner* — Robert E Pezzuto
(74) *Attorney, Agent, or Firm* — Brooks Kushman P.C.

(57) ABSTRACT

A stabilizer for an attachment device of a vehicle comprises a first adjusting element and a second adjusting element which are guided adjustably relative to one another along a longitudinal axis in order to vary the length of the stabilizer, a first connecting element on the first adjusting element for supporting the stabilizer against the vehicle, and a second connecting element on the second adjusting element for supporting the stabilizer against an element of the attachment device, the second connecting element being connected to the second adjusting element such that it can be rotated about the longitudinal axis via a screw connection for adjusting the length of the second adjusting element. The stabilizer further has a locking device, which is connected to the second adjusting element and the second connecting (Continued)

element, the second adjusting element and the second connecting element being connected to one another in a rotationally fixed manner in a locking position of the locking device.

14 Claims, 5 Drawing Sheets

(56) References Cited

U.S. PATENT DOCUMENTS

| | | | |
|---|---|---|---|
| 6,131,937 A | | 10/2000 | Coenen |
| 6,386,571 B1 * | | 5/2002 | Vollmer ............. A01B 59/0415 |
| | | | 172/450 |
| 8,851,199 B2 * | | 10/2014 | Sauermann ........ A01B 59/0415 |
| | | | 172/450 |
| 9,480,197 B2 * | | 11/2016 | Heitlinger ............ A01B 59/041 |
| 2006/0127166 A1 | | 6/2006 | Huenink et al. |
| 2014/0210183 A1 | | 7/2014 | Heitlinger et al. |

FOREIGN PATENT DOCUMENTS

| | | |
|---|---|---|
| DE | 19744328 C1 | 10/1998 |
| EP | 1671527 A1 | 6/2006 |
| EP | 2744320 B1 | 2/2020 |
| GB | 2172082 A | 9/1986 |

\* cited by examiner

STABILIZER

CROSS-REFERENCE TO RELATED APPLICATIONS

This application claims priority to European Application No. EP20214377.2, filed on Dec. 15, 2020, which application is hereby incorporated herein by reference in its entirety.

BACKGROUND

A stabilizer for an attachment device of a vehicle is known, for instance, from EP 2 744 320 B1. The stabilizer can be adjusted in length to accommodate implements of different widths that can be connected to the attachment device. A screw connection between the second connecting element and the second adjusting element is used for this purpose. The second connecting element can be held or fixed to the second adjusting element in different axial positions relative thereto. In the assembled state, the first connecting element is connected to the vehicle in a pivotable manner, but is coupled to the vehicle in a rotationally fixed manner about a longitudinal axis of the stabilizer. The second connecting element is also pivotably attached, for example to a lower link of the attachment device, but is held fixed against rotation about the longitudinal axis of the stabilizer. To allow the second connecting element to be rotated relative to the second adjusting element for length variation by the screw connection, the first adjusting element and the second adjusting element are held rotatable relative to each other about the longitudinal axis of the stabilizer. In the assembled state of the stabilizer, the second adjusting element can thus be rotated relative to the second connecting element, so that the length of the stabilizer can be changed by the screw connection.

In order to prevent an unintentional rotation of the second adjusting element relative to the second connecting element and thus an unintentional change in the length of the stabilizer, the stabilizer according to EP 2 744 320 B1 has a spring bracket, which is pivotally attached to the first adjusting element and engages in a locking position in a recess of a locking collar, the locking collar being arranged on the second adjusting element. This results in a relative movement of the spring bracket relative to the locking collar when the two adjusting elements are moved in and out of spring. This can lead to increased wear of the components moving relative to each other.

SUMMARY

The present disclosure relates to a stabilizer for an attachment device of a vehicle, which has a first adjusting element and a second adjusting element, which are guided adjustably relative to one another along a longitudinal axis for adjusting the length of the stabilizer, a first connecting element on the first adjusting element for supporting the stabilizer against the vehicle, and a second connecting element on the second adjusting element for supporting the stabilizer against an element of the attachment device. For adjusting the length of the second adjusting element, the second connecting element is connected to the second adjusting element such that it can be rotated about the longitudinal axis via a screw connection. It is an aspect of the present disclosure to provide a stabilizer variable length which is less susceptible to wear.

According to one aspect a stabilizer for an attachment device of a vehicle comprises a first adjusting element and a second adjusting element, which are guided adjustably relative to one another along a longitudinal axis for adjusting the length of the stabilizer, a first connecting element on the first adjusting element for supporting the stabilizer against the vehicle, and a second connecting element and the second adjusting element for supporting the stabilizer against an element of the attachment device. For adjusting the length of the second adjusting element, the second connecting element is connected to the second adjusting element such that it can be rotated about the longitudinal axis via a screw connection. The stabilizer further comprises a locking device which is connected to the second adjusting element and the second connecting element, the second adjusting element and the second connecting element being connected to one another in a rotationally fixed manner in a locking position of the locking device.

By the fact that the locking device is connected to the second adjusting element and the second connecting element, it is ensured on the one hand that the second adjusting element cannot be rotated relative to the second connecting element in the locking position. On the other hand, it is ensured that the locking device is attached to two elements, namely the second adjusting element and the second connecting element, which are not moved relative to each other when the two adjusting elements are moved relative to each other. This prevents wear on the locking device.

In an exemplary embodiment of the stabilizer, the locking device comprises a bracket which is adjustably, e.g., pivotably, connected to one of the two elements of the group comprising the second adjusting element and the second connecting element. Further, the locking device comprises a locking element attached to the other one of the of the two elements of the group comprising the second adjusting element and the second connecting element. In the locking position of the locking device, the bracket is supported against the locking element in the direction of rotation about the longitudinal axis.

In this regard, the locking element may have a slot, wherein the bracket is aligned parallel to the longitudinal axis in the locking position of the locking device and engages in the slot of the locking element.

The stabilizer may further comprise a latch adjustably connected to one of the two elements of the group consisting the first adjusting element and the second adjusting element. The stabilizer may further comprise at least one latching element connected to the other of the two elements of the group consisting of the first adjusting element and the second adjusting element. The latch can be transferred into a latching position, in which the first adjusting element and the second adjusting element are supported against each other at least in the axial direction.

Here, the at least one latching element may be the locking element.

The bracket can be rigid or elastically resilient, for example in the form of a spring bracket.

The stabilizer can be a purely mechanical stabilizer or also as a hydraulically actuated stabilizer, wherein in the latter case the first adjusting element comprises a hydraulic cylinder, e.g., a single-acting hydraulic cylinder, which can be acted upon by hydraulic pressure for extension.

In one embodiment of the stabilizer, the second connecting element may be fixable to the second adjusting element in at least an extending position and a shortening position. In a maximally retracted position of the first adjusting element and the second adjusting element relative to each other and in the extending position of the second connecting element, the first adjusting element can be axially supported against the second connecting element or the second adjusting element. Further, in the maximally retracted position of the first adjusting element and the second adjusting element relative to each other and in the shortening position of the second connecting element, the first adjusting element can be axially supported against the second connecting element.

Due to the fact that in the maximally retracted position of the first adjusting element and the second adjusting element relative to each other and in the shortening position of the second connecting element, the first adjusting element is axially supported against the second connecting element, the maximally retracted position is dependent on the position of the second connecting element relative to the second adjusting element. The position of the second connecting element relative to the second adjusting element is in turn dependent on the required length setting of the stabilizer and thus on the category with respect to the width of the implement to be attached. Thus, when the length of the stabilizer is adjusted to a particular category of implement, the result is automatically an adjustment of the length of the floating distance. As the length of the stabilizer is reduced to accommodate a wider implement, the second connecting element is moved to a shortening position so that it comes into contact earlier with the first adjusting element when it is adjusted relative to the second adjusting element. As a result, the floating distance is reduced compared to an extended position of the second connecting element.

According to an exemplary embodiment, the second adjusting element comprises a guide receptacle, in which a guide portion of the first adjusting element is axially adjustably guided. The first adjusting element and the second adjusting element are guided telescopically with respect to each other in that the second adjusting element is inserted into the guide receptacle of the first adjusting element.

Furthermore, the second adjusting element may comprise an adjustment receptacle, in which a shank of the second connecting element is received in an axially adjustable manner, the adjustment receptacle merging into the guide receptacle. In the shortening position of the second connecting element, the latter plunges further into the adjustment receptacle than in an extending position. Furthermore, the shank of the second connecting element plunges into the guide receptacle of the second adjusting element.

The shank of the second connecting element can thus project into the guide receptacle in the shortening position of the second connecting element, wherein, in the maximally retracted position of the first adjusting element and the second adjusting element relative to each other, the guide portion of the first adjusting element is axially supported against the shank of the second connecting element.

The shank and the adjustment receptacle can form a screw connection together. The shank can be designed as a threaded shank with an external thread, which is screwed into an internal thread of the adjustment receptacle.

A spring or spring arrangement may be provided so that the first adjusting element and the second adjusting element are adjustable from an initial position towards the maximally retracted position against the force of the spring.

Further, a spring or spring arrangement may be provided such that the first adjusting element and the second adjusting element are adjustable from an initial position towards a maximally extended position against the force of a spring.

The spring or spring arrangement for generating a force when moving towards the maximally retracted position can be the same spring or spring arrangement for generating a force when moving towards the maximally extended position.

BRIEF SUMMARY OF THE DRAWINGS

Exemplary embodiments of stabilizers are explained in more detail below with reference to the Figures. Herein.

DESCRIPTION

Figure 1:
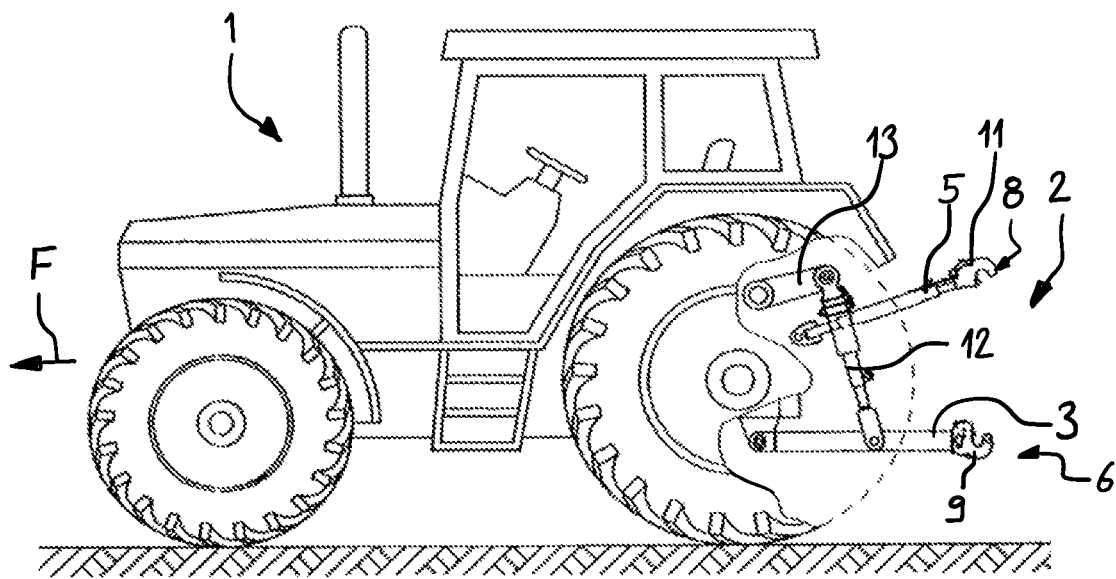
FIG. 1 shows a tractor with a three-point attachment device.

FIG. 1 shows a vehicle, in this example an agricultural machine in the form of a tractor 1 with an implement arranged at its rear in the form of a three-point attachment device 2 with two lower links, of which one lower link 3 is visible in FIG. 1, and an upper link 5. The lower link 3 is pivotably attached to the tractor 1 at one end. In addition to the visible lower link 3, another lower link 4 (FIG. 2) is fitted. Above and between these two lower links 3, 4, the upper link 5 is hinged at one end to the rear of the tractor 1. The lower links 3, 4 and the upper link 5 are used to attach an implement not shown to the tractor 1. For this purpose, coupling hooks 9, 10, 11 are attached to free ends 6, 7 of the lower links 3, 4 and to a free end 8 of the upper link 5, which serve to receive coupling elements of the implement.

For vertically raising and lowering the implement to be hitched, the lower link 3 is linked to a lifting arm 13 by means of a lifting strut 12. The lifting arm 13 is connected to a power drive (not shown), by means of which the lifting arm 13 can be raised and lowered. The lower link 3 is thus also raised or lowered via the lifting strut 12. The lower link 4, which is not visible in FIG. 1, is connected in an identical manner to a further lifting strut and a further lifting arm.

Figure 2:
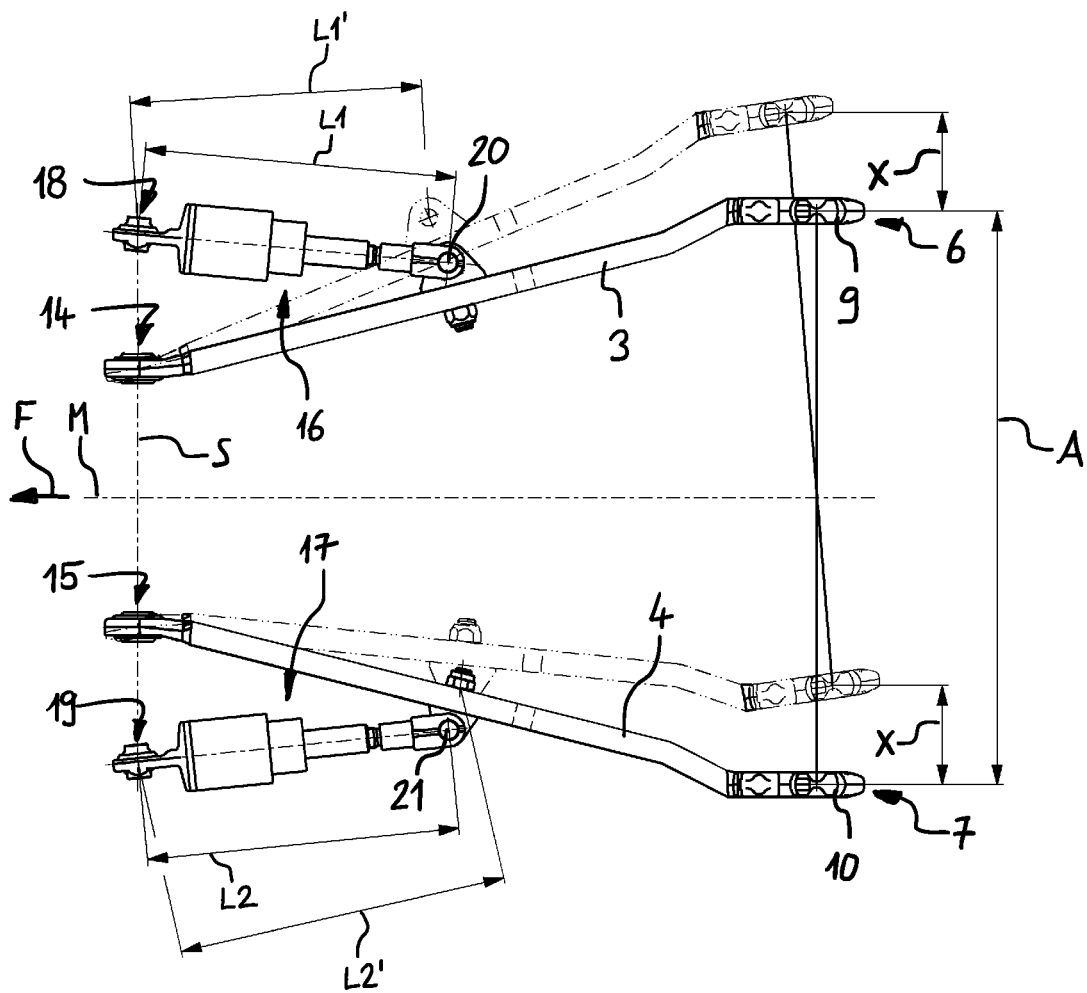
FIG. 2 shows a schematic top view of the lower links of the three-point attachment device according to FIG. 1 with stabilizers to stabilize the lower links.
Figure 3:
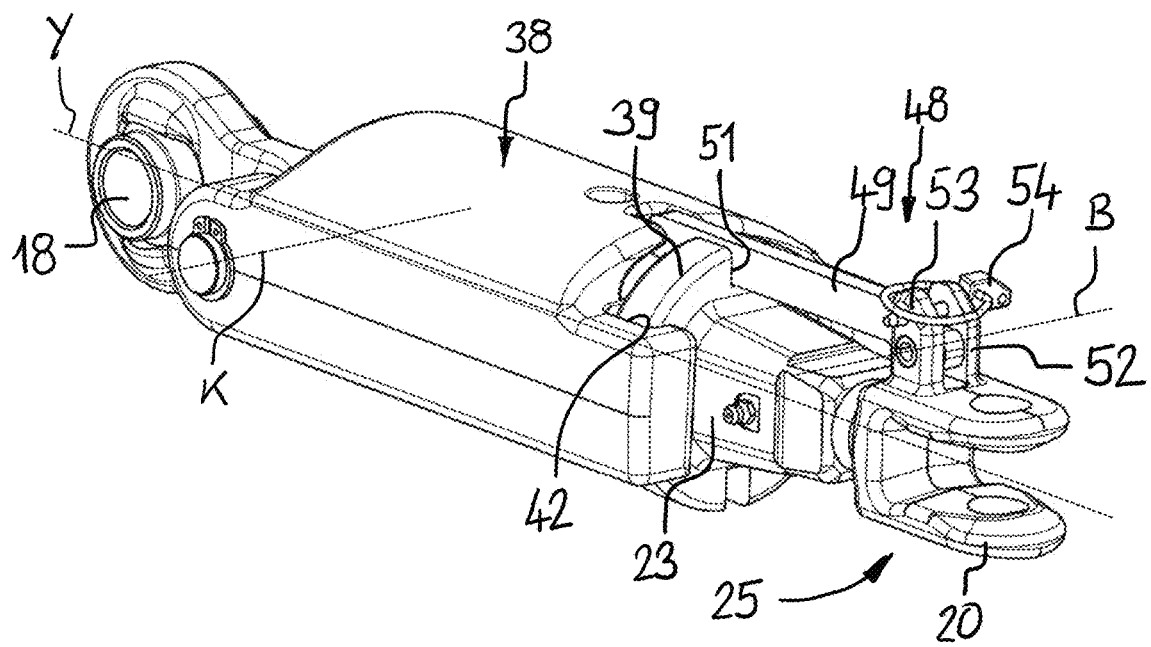
FIG. 3 shows a perspective view of a stabilizer, which can be latched in tension and compression, with a second connecting element in a shortening position.
Figure 4:
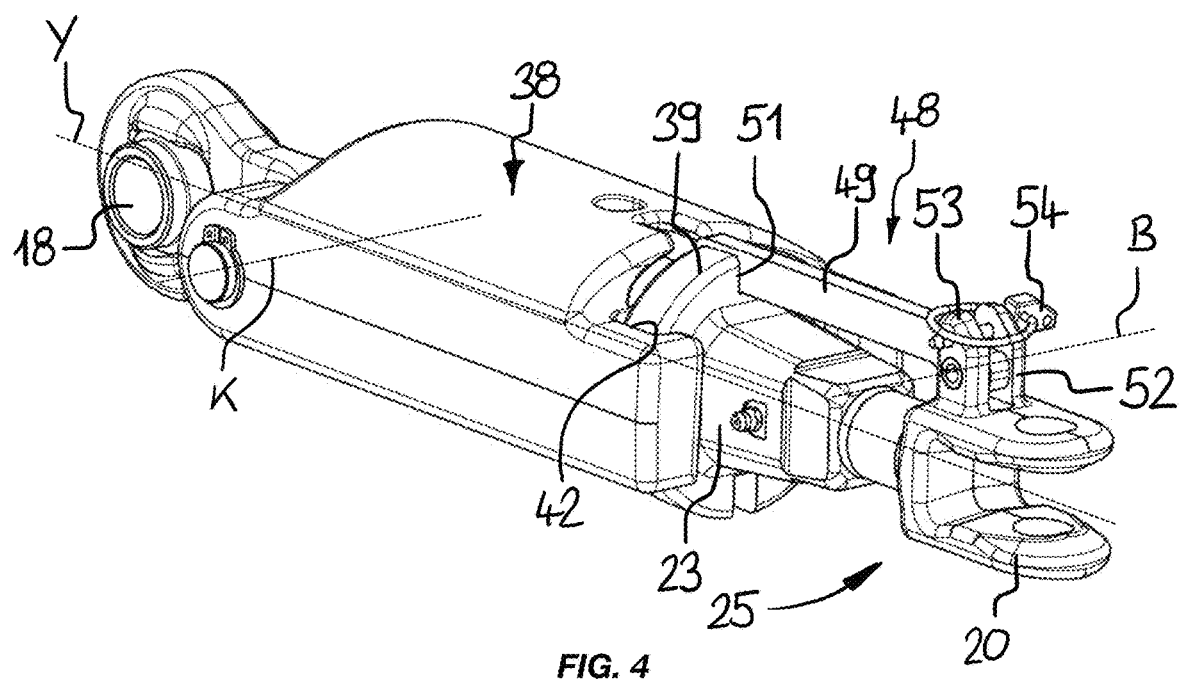
FIG. 4 shows a perspective view of the stabilizer of FIG. 3 with the second connecting element in an extending position.
Figure 5:
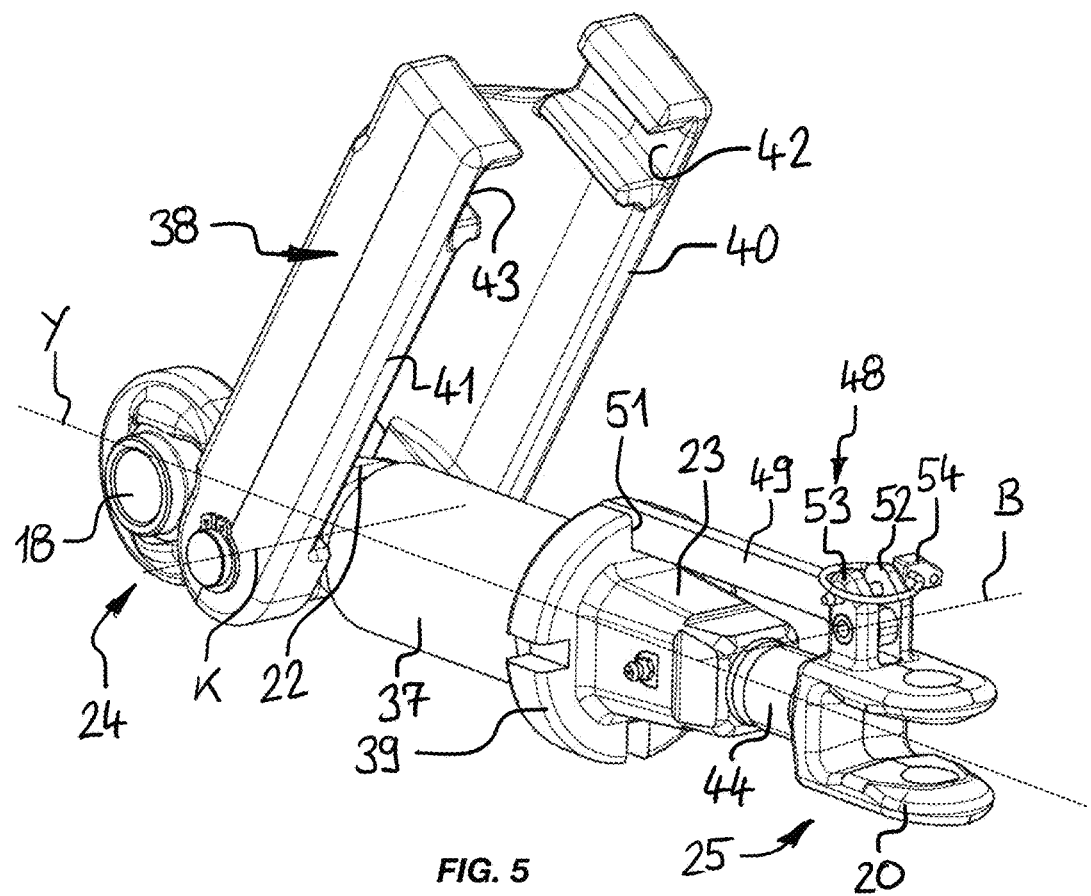
FIG. 5 shows a perspective view of the stabilizer according to FIG. 3 with a latch in a floating position.
Figure 6:
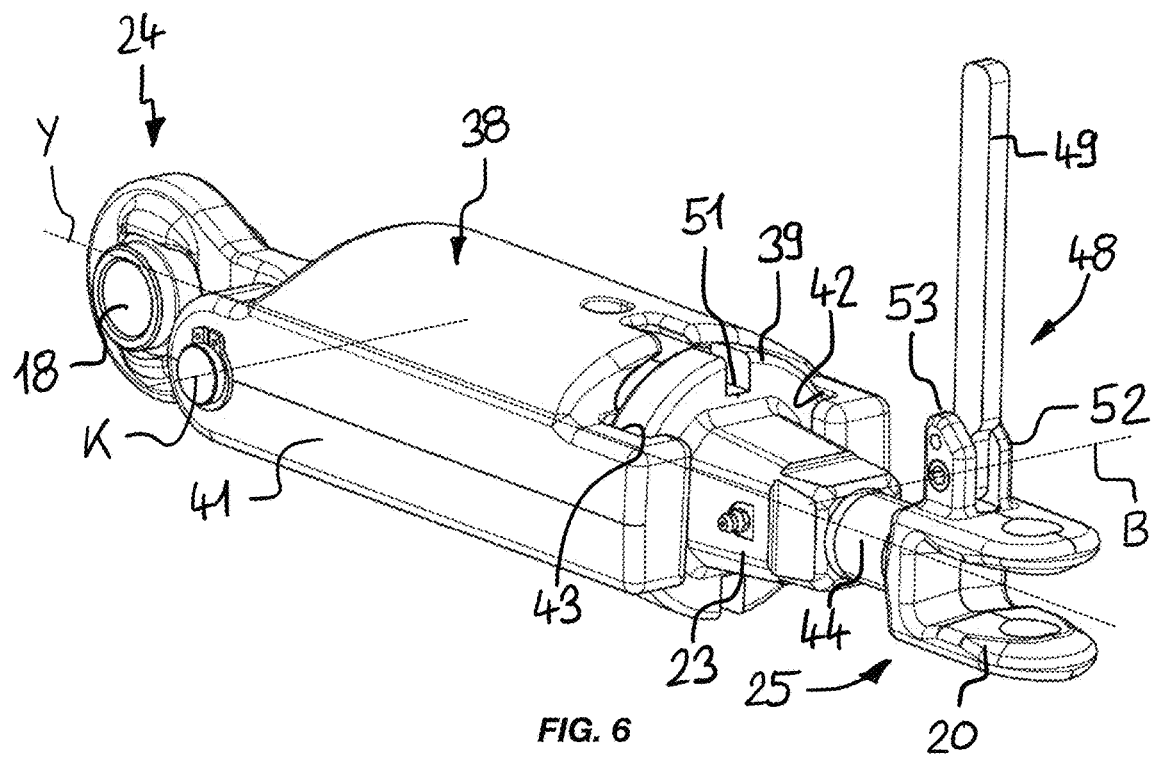
FIG. 6 shows a perspective view of the stabilizer according to FIG. 3 with a bracket of a locking device in a release position.

FIG. 2 shows a top view of the two lower links 3, 4, which are arranged to pivot about a pivot axis S at attachment points 14, 15 at the rear of the tractor 1. The two attachment points 14, 15 are laterally offset with equal spacing from a tractor longitudinal axis M. The two lower links 3, 4 can perform both lateral movements and lifting movements. The lower links 3, 4 are shown with solid lines in a centered central position in which the lower links 3, 4 are arranged in mirror symmetry to the tractor longitudinal axis M so that the coupling hooks 9, 10 of the lower links 3, 4 are arranged at the same distance from the tractor longitudinal axis M.

The lower links 3, 4 can each be pivoted from the centered central position in the lateral direction about an axis arranged perpendicular to the pivot axis S and to the longitudinal axis M of the tractor. FIG. 2 shows the lower links 3, 4 in an exemplary pivoted lateral position in dashed lines. In this case, the coupling hooks 9, 10 of the lower links 3, 4 are offset laterally by the dimension X in relation to the central position.

For stabilization, i.e. to prevent lateral movements of the two lower links 3, 4, stabilizers 16, 17 are connected to each of them. The two stabilizers 16, 17 are each fixed at one end by means of first connection means 18, 19 laterally offset with respect to the attachment points 14, 15 of the lower links 3, 4 to corresponding fixing means centered on the pivot axis S at the rear of the tractor 1. By means of second connecting means 20, 21 provided at the other ends of the stabilizers 16, 17, the stabilizers 16, 17 are each connected to one of the lower links 3, 4.

If a lateral movement occurs on the lower links 3, 4 when the implement is attached, a displacement of the two lower links 3, 4 takes place, for example from the central position shown in solid lines to the lateral position shown in dashed lines. In this case, the lengths L1, L2 of the two stabilizers 16, 17 change, wherein the lengths L1, L2 correspond to the distances between the first connection means 18, 19 and the second connection means 20, 21. The length L1 of the stabilizer 16 on the right-hand lower link 3, viewed in the direction of travel F, is shortened from the dimension L1 to L1'. The length L2 of the stabilizer 17 on the left-hand lower link 4, viewed in the direction of travel F, is increased from the dimension L2 to L2'. The changes in length of the two lower stabilizers 16, 17 are different.

If the lower links 3, 4 were pivoted about the attachment points 14, 15 in the opposite direction to that shown in FIG. 2, the length L1 would be increased and the length L2 shortened accordingly.

By structurally determining the stabilizers 16, 17 with regard to the maximum shortening, the stabilizers 16, 17 ensure that the lower links 3, 4 do not strike against rear wheels of the tractor 1 in a maximum lateral position (for example, according to the position shown in dashed lines in FIG. 2). Furthermore, the two stabilizers 16, 17 serve to be able to keep an attached implement centered on the longitudinal axis M of the tractor when the three-point attachment device 2 is in a raised transport condition, for example. The same also applies when no implement is attached and the lower links 3, 4 are in a transport position. In this state, the two stabilizers 16, 17 ensure that the lower links 3, 4 are held in such a way that they cannot move laterally outwards from the longitudinal axis M of the tractor in the set spreading dimension A. The spreading dimension A between the coupling hooks 9, 10 of the two lower links 3, 4 can be adjusted by means of telescopic adjustments integrated in the stabilizers 16, 17, which are adjustable by hand, if implements of a category different from the one set in each case are to be coupled.

Figure 7:
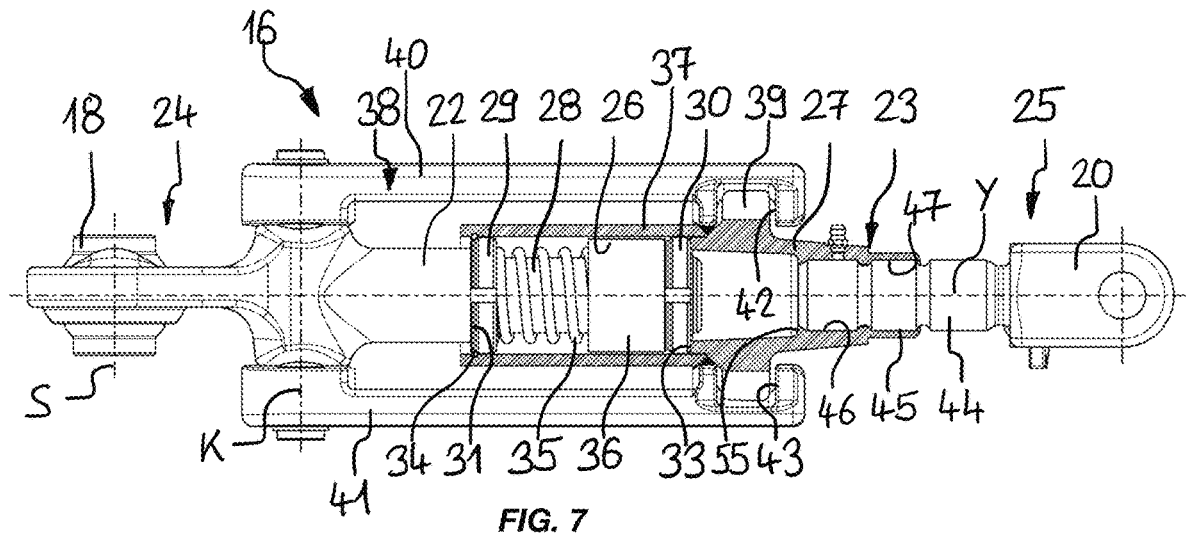
FIG. 7 shows a partial longitudinal section of the stabilizer according to FIG. 3 in an initial position and with the second connecting element in the extending position.
Figure 8:
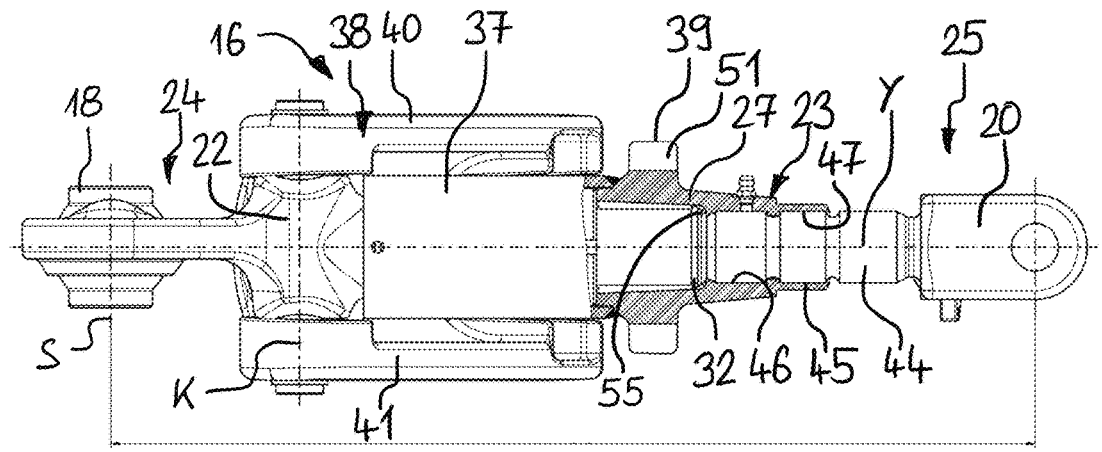
FIG. 8 shows a partial longitudinal section of the stabilizer shown in FIG. 3 in a maximally retracted position and with the second connecting element in the extending position.
Figure 9:
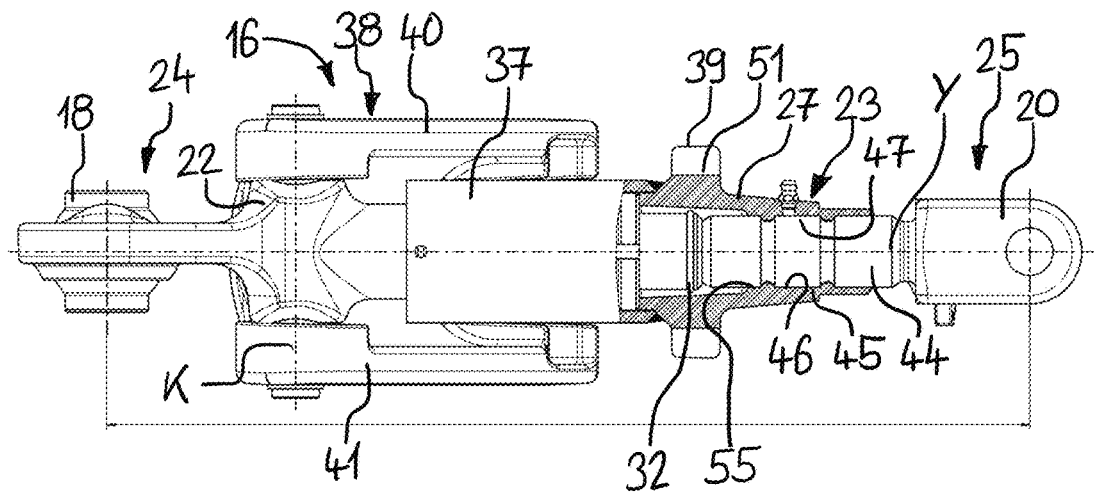
FIG. 9 shows a partial longitudinal section of the stabilizer according to FIG. 3 in a maximally retracted position and with the second connecting element in the shortening position.

FIGS. 3 to 6 show the stabilizer 16 on the right-hand lower link 3 as shown in FIG. 2 in different positions, wherein the stabilizer 17 on the left-hand lower link 4 may be of identical construction. FIGS. 7 to 9 show the stabilizer 16 in a partial longitudinal section also in different positions. The FIGS. 3 to 9 are described together in the following.

The stabilizer 16 comprises a first adjusting element 22 and a second adjusting element 23, which are adjustably guided relative to each other for a length variation of the stabilizer 16 along a longitudinal axis Y of the stabilizer 16.

In order to support the stabilizer 16 against the tractor or to attach the stabilizer 16 to the tractor, a first connecting element 24 is arranged on the first adjusting element 22 with the first connecting means 18, here in the form of a ball joint. In this regard, the first connecting element 24 is an integral part of the first adjusting element 22, but may also be formed as a separate component that is connected to the first adjusting element 22.

The stabilizer 16 further comprises a second connecting element 25, connected to the second adjusting element 23, for supporting or attaching the stabilizer 16 to a lower link of the attachment device. The second connection element 25 has the second connection means 20, here in the form of a fastening fork. The second connecting element 25 is axially adjustable along the longitudinal axis Y and is attached to the second adjusting element 23 via a screw connection, which will be explained in more detail below.

For guiding the first adjusting element 22 relative to the second adjusting element 23, and thus varying the length of the stabilizer 16, the first adjusting element 23 includes a guide receptacle 26 formed by a tube 37. The tube 37 is welded to a base body 27 of the second adjusting element 23 coaxial with the longitudinal axis Y, the guide receptacle 26 of the tube 37 being open in the direction of the first connecting element 24. A guide portion 28 of the first adjusting element 22 is axially adjustably guided in the guide receptacle 26.

For this purpose, a rear thrust ring 29 and a front thrust ring 30 are seated on the guide portion 28 of the first adjusting element 22 and are slidably guided on the guide portion 28. In an initial position of the first adjusting element 22 and the second adjusting element 23 relative to each other (FIG. 7), the rear thrust ring 29 is axially supported against a shoulder 31 of the first adjusting element 22 in direction towards the first connecting element 24. The front thrust ring 30 is axially supported against a retaining ring 32 on the guide portion 28 of the first adjusting element 22 in the direction towards the second connecting element 25. Furthermore, the front thrust ring 30 is axially supported against a shoulder 33 of the second adjusting element 23 in a direction towards the second connecting element 25, and the rear thrust ring 29 is axially supported against a retaining ring 34 of the second adjusting element 23 in a direction towards the first connecting element 24. The two thrust rings 29, 30 are supported against each other by means of a spring or spring arrangement, in this case a compression spring 35, the compression spring 35 being in the form of a helical spring and being seated coaxially with the longitudinal axis Y on the guide portion 28 of the first adjusting element 22.

Further, a sleeve 36 is arranged between the two thrust rings 29, 30, against which the thrust rings 29, 30 can be axially supported and which is arranged around the compression spring 35. The axial length of the sleeve 36 is less than the distance between the two thrust rings 29, 30 in the initial position, as shown in FIG. 7, of the first adjusting element 22 and the second adjusting element 23 to each together.

If a force is now exerted on the second adjusting element 23 along the longitudinal axis Y in the direction of the first connecting element 24 to retract the stabilizer 16, the second adjusting element 23 is supported against the front thrust ring 30 via the shoulder 33. The second adjusting element 23 presses the front thrust ring 30 against the spring force of the compression spring 35 on the guide portion 28 of the first adjusting element 22 in direction towards the rear thrust ring 29. Here, the front thrust ring 30 displaces the sleeve 36 until the front thrust ring 30 is supported against the rear thrust ring 29 via the sleeve 36. The force is supported by the rear thrust ring 29 against the first adjusting element 22 via the shoulder 31. This position of the stabilizer 16 is shown in FIG. 8 and corresponds to a maximum retracted position of the first adjusting element 22 and the second adjusting element 23 with respect to each other.

In addition, the stabilizer 16 can be further extended from the initial position shown in FIG. 7 by applying a force to the second adjusting element 23 along the longitudinal axis Y away from the first connecting element 24. In this case, the second adjusting element 23 is supported against the rear thrust ring 29 via the retaining ring 34 and displaces the latter on the guide portion 28 of the first adjusting element 22 in the direction towards the front thrust ring 30 until the rear thrust ring 29 is supported against the front thrust ring 30 via the sleeve 36. The front thrust ring 30 is in turn axially supported on the guide portion 28 of the first adjusting element 22 via the retaining ring 32. This position corresponds to a maximally extended position (not shown) of the first adjusting element 22 and the second adjusting element 23 to each other.

Since the rear thrust ring 29 and the front thrust ring 30 are loaded against each other by the compression spring 35, the stabilizer 16 is always pressed into the starting position as shown in FIG. 7, provided that no external forces act on the stabilizer 16.

In order to lock the stabilizer 16 against a length adjustment or an adjustment of the first adjusting element 22 and the second adjusting element 23 relative to each other, the stabilizer 16 comprises a latch 38 which is pivotably connected to the first adjusting element 22 about a latch axis K. The latch axis K runs transversely to the longitudinal axis Y and intersects it, for example at a right angle or crosses it at a distance.

The second adjusting element 23 includes a latching element 39 in the form of an outwardly projecting circumferential collar. The latch 38 includes two side walls 40, 41 that partially receive the first adjusting element 22 and the second adjusting element 23 therebetween when the latch 38 is in a latching position. Furthermore, the side walls 40, 41 each comprise a latching recess 42, 43, which face each other and which receive the latching element 39 in the latching position of the latch 38 in such a way that the latching element 39 is supported in both adjustment directions of the second adjusting element 23 relative to the first adjusting element 22. An adjustment of the second adjusting element 23 with respect to the first adjusting element 22 is thus prevented.

In a floating position, the latching element 39 is not received in the latching recesses 42, 43 of the latch 38, so that the second adjusting element 23 is free to move relative to the first adjusting element 22.

In principle, the latch 38 may also be pivotably attached to the second adjusting element 23, in which case the latching element 39 is arranged on the first adjusting element 22.

In order to be able to adapt the stabilizer 16 to implements of different widths, the length of the stabilizer 16 can be varied independently of the position of the two adjusting elements 22, 23 relative to each other. For this purpose, as already explained above, the second connecting element 25 is adjustable in its axial position with respect to the second adjusting element 23. For this purpose, the second connecting element 25 has a shank 44 which is provided with an external thread 45. The second adjusting element 23 comprises an adjustment receptacle 46, which is arranged coaxially with respect to the longitudinal axis Y and is provided with an internal thread 47. The shank 44 is screwed with its external thread 45 coaxial to the longitudinal axis Y into the internal thread 47 of the adjustment receptacle 46. The axial position of the second connection element 25, and hence the second connection means 20, relative to the first connection means 16 can be adjusted by screwing the shank 44 into the adjustment receptacle 46 to different depths.

The adjustment receptacle 46 merges with the guide receptacle 26 of the second adjusting element 23. Depending on how deep the shank 44 is screwed into the adjustment receptacle 46, the shank 44 projects into the guide receptacle 26, as can be seen for example in FIG. 9. Thus, in the maximally retracted position of the stabilizer 16, the guide portion 28 of the first adjusting element 22 abuts axially against, and is axially supported against, the shank 44 of the second connector element 25. If, on the other hand, the shank 44 is not screwed into the adjustment receptacle 46 to such an extent that it projects into the guide receptacle 26, then in the maximally retracted position of the stabilizer 16 the guide portion 28 of the first adjusting element 22 is supported axially against a circumferential shoulder 55 of the base body 27 of the second adjusting element 23 (as shown in FIG. 8). Thus, in this case, the stabilizer 16 can be retracted further than is the case when the shank 44 of the second connecting element 25 extends into the guide receptacle 26. The free floating distance of the stabilizer can thus be changed.

It should be noted that the maximally retracted position of the stabilizer 16 depends on the position of the second connecting element 25 on the second adjusting element 23.

To adjust the second connecting element 25 relative to the second adjusting element 23, the second adjusting element 23 is rotated about the longitudinal axis Y when the stabilizer 16 is mounted on the tractor and on the attachment device. Since the second connecting element 25 is supported in a rotationally fixed manner relative to the lower link of the attachment device via the second connecting means 20, the shank 44 is screwed into or out of the adjustment receptacle 46 by rotating the second adjusting element 23.

A locking device 48 is provided to prevent unintentional rotation of the second adjusting element 23, and thus unintentional adjustment of the axial position of the second connecting element 25. The locking device 48 comprises a bracket 49 pivotably mounted to the second connecting element 25 between a locking position shown in FIG. 5 and a release position shown in FIG. 6. In this case, the bracket 49 can be pivoted about a bracket axis B, which is arranged parallel to the latch axis K. In principle, the bracket 49 may also be otherwise adjustable, for example movable parallel to the longitudinal axis Y.

The locking device 48 further comprises a locking element in the form of a radially outwardly projecting collar coaxial with the longitudinal axis Y. In the present case, the latching element 39 for locking the axial movement of the two adjusting elements relative to each other is also the locking element.

However, it is also conceivable that the locking element is formed separately from the latching element 39. The locking element may, for example, be formed between the latching element 39 and the second connecting element 25 on the first adjusting element 23 in the form of a radially projecting circumferential collar, comparable to the latching element 39. It is also conceivable that a plurality of locking elements distributed around the circumference are provided on the second adjusting element 23. Similarly, a plurality of latching elements may be arranged around the circumference of the second adjusting element 23, which simultaneously form the locking elements.

Slots 51 are arranged in the locking element (latching element) 39, distributed over the circumference, into which, depending on the rotational position of the second adjusting element 23 relative to the second connecting element 25, the bracket 49 can plunge and connects the second adjusting element 23 and the second connecting element 25 to one another in a rotationally fixed manner or supports them against one another in a rotationally fixed manner.

The bracket 49 is pivotably held between two tabs 52, 53 which are integral parts of the second connecting element 25. To fixedly hold the bracket 49 in its locking position, a locking pin 54 is fixable to the two tabs 52, 53.

Figure 10:
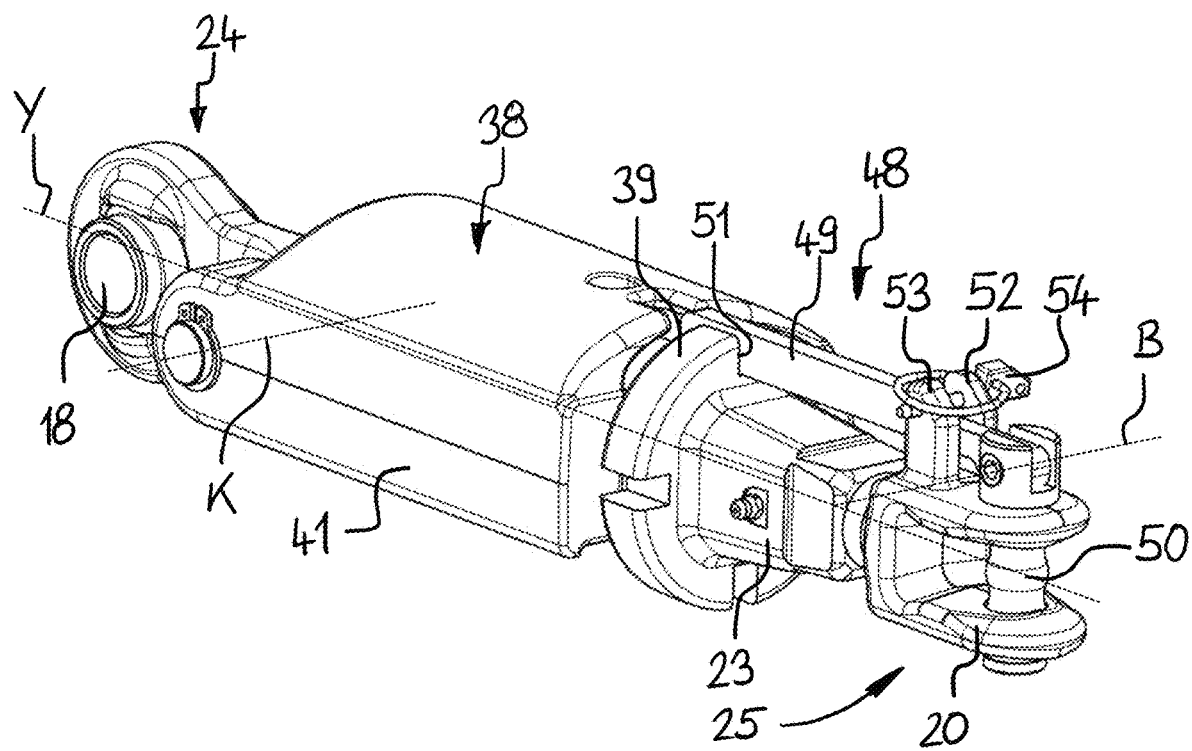
FIG. 10 shows a perspective view of a further embodiment of a stabilizer, which can only be latched in response to pressure and with a bracket of the locking device pivotably attached to a pin of a fastening fork of the second connecting element.

FIG. 10 shows a further embodiment of a stabilizer, wherein corresponding elements are provided with the same reference signs as in the embodiment according to FIGS. 3 to 9 and described there. In contrast to the stabilizer according to FIGS. 3 to 9, the bracket 49 is pivotably attached to an attachment bolt 50, the attachment bolt 50 being part of the second connection means 20 on the second connection element 25 and serving to fix the stabilizer to the lower link. The bracket 49 is arranged in its locking position between the two tabs 52, 53 and plunges into the slot 51 of the locking element (latching element) 39 and is fixed to the two tabs 52, 23 by the locking pin 54. Moreover, the latch 38 is configured such that the stabilizer 16 can only be locked against retraction, that is, in response to compression and not in response to tension. The latch is designed without a latching recess for this purpose. In the latching position of the latch 38, the latching element 39 is only axially supported against the latch 38 at the end face. In all other respects, the stabilizer 16 according to FIG. 10 is of identical construction to the stabilizer according to FIGS. 3 to 9.

LIST OF REFERENCE NUMBERS

1 Tractor
2 Three-point attachment device
3 Lower link
4 Lower link
5 Top link
6 Free end
7 Free end
8 Free end
9 Coupling hook
10 Coupling hook
11 Coupling hook
12 Lifting strut
13 Lifting arm
14 Attachment point
15 Attachment point
16 Stabilizer
17 Stabilizer
18 First connection means
19 First connection means
20 Second connection means
21 Second connection means
22 First adjusting element
23 Second adjusting element
24 First connecting element
25 Second connecting element
26 Guide receptacle
27 Base body
28 Guide portion
29 Rear thrust ring
30 Front thrust ring
31 Shoulder
32 Retaining ring
33 Shoulder
34 Retaining ring
35 Pressure spring
36 Sleeve
37 Pipe
38 Latch
39 Latching element/locking element
40 Side wall
41 Side wall
42 Latching recess
43 Latching recess
44 Shank
45 External thread
46 Adjustment receptacle
47 Internal thread
48 Locking device
49 Bracket
50 Attachment bolt
51 Slot
52 Tab
53 Tab
54 Locking pin
A Spreading dimension
B Bracket axis
K Latch axis
L1, L1' Length
L2, L2' Length
M Tractor longitudinal axis
S Pivot axis
X Side shift
Y Longitudinal axis

The invention claimed is:

1. A stabilizer for an attachment device of a vehicle comprising:
a first adjusting element and a second adjusting element which are adjustably guidable relative to one another along a longitudinal axis in order to vary the length of the stabilizer;
a first connecting element on the first adjusting element for supporting the stabilizer against the vehicle;
a second connecting element on the second adjusting element for supporting the stabilizer against an element of the attachment device, the second connecting element being connected to the second adjusting element such that it is rotatable about the longitudinal axis via a screw connection for adjusting the length of the second adjusting element; and
a locking device, which in a locking position of the locking device is directly connected to the second adjusting element and the second connecting element, the second adjusting element and the second connecting element being connected to one another in a rotationally fixed manner.

2. The stabilizer of claim 1,
wherein the locking device includes a bracket, which is adjustably connected pivotably to one of the two elements of the group comprising the second adjusting element and the second connecting element;
wherein the locking device includes a locking element, which is fastened to the other of the two elements of the group comprising the second adjusting element and the second connecting element; and wherein, in the locking position of the locking device, the bracket is supported against the locking element in the direction of rotation about the longitudinal axis (Y).

3. The stabilizer of claim 2,
wherein the locking element includes a slot; and
wherein, in the locking position of the locking device, the bracket is aligned parallel to the longitudinal axis and engages in the slot of the locking element.

4. The stabilizer of claim 2,
wherein the stabilizer further comprises a latch adjustably connected to one of the two elements of the group consisting of the first adjusting element and the second adjusting element;
wherein the stabilizer further comprises at least one latching element, which is connected to the other of the two elements of the group consisting of the first adjusting element and the second adjusting element; and
wherein the latch can be transferred into a latching position, in which the first adjusting element and the second adjusting element are supported against one another at least in one axial direction of the longitudinal axis.

5. The stabilizer of claim 4, wherein the at least one latching element is the locking element.

6. The stabilizer of claim 2, wherein the bracket is rigid or elastically resilient.

7. The stabilizer of claim 1, wherein the first adjusting element comprises a hydraulic cylinder.

8. The stabilizer of claim 7, wherein the hydraulic cylinder is a single-acting hydraulic cylinder to which hydraulic pressure can be applied in an extension direction.

9. The stabilizer of claim 1,
wherein the second connecting element is fixable to the second adjusting element at least in an extending position and in a shortening position;
wherein, in a maximally retracted position of the first adjusting element and the second adjusting element relative to each other and in the extending position of the second connecting element, the first adjusting element is axially supported against the second connecting element or the second adjusting element; and
wherein, in the maximally retracted position of the first adjusting element and the second adjusting element relative to each other and in the shortening position of the second connecting element, the first adjusting element is axially supported against the second connecting element.

10. The stabilizer of claim 9,
wherein the second adjusting element includes a guide receptacle, in which a guide portion of the first adjusting element is guidable in an axially adjustable manner.

11. The stabilizer of claim 10,
wherein the second adjusting element includes an adjusting receptacle in which a shank of the second connecting element is received in an axially adjustable manner, the adjusting receptacle merging into the guide receptacle.

12. The stabilizer of claim 11,
wherein the shank of the second connecting element projects into the guide receptacle in the shortening position of the second connecting element, the guide portion of the first adjusting element being supported axially against the shank of the second connecting element in the maximum retracted position of the first adjusting element and of the second adjusting element with respect to one another.

13. The stabilizer of claim 1,
wherein the first adjusting element and the second adjusting element can be adjusted, starting from an initial position, in the direction towards a maximum retracted position against the force of a spring.

14. The stabilizer of claim 1,
wherein the first adjusting element and the second adjusting element can be adjusted, starting from an initial position, in the direction towards a maximally extended position against the force of a spring.

* * * * *